United States Patent [19]

Aida

[11] Patent Number: 5,500,746
[45] Date of Patent: Mar. 19, 1996

[54] COLOR IMAGE INPUT APPARATUS

[75] Inventor: Midori Aida, Yokohama, Japan

[73] Assignee: Ricoh Company, Ltd., Tokyo, Japan

[21] Appl. No.: 245,658

[22] Filed: May 18, 1994

[30] Foreign Application Priority Data

May 19, 1993 [JP] Japan .................... 5-141525

[51] Int. Cl.⁶ ................. G03F 3/08; H04N 1/46
[52] U.S. Cl. ............. 358/518; 358/501; 358/504; 358/514
[58] Field of Search ................. 358/501, 504, 358/513, 514, 515, 516, 518, 401, 406, 445, 461, 474, 482, 483

[56] References Cited

U.S. PATENT DOCUMENTS

| | | | |
|---|---|---|---|
| 4,667,227 | 5/1987 | Ikeda | 358/514 |
| 5,313,313 | 5/1994 | Sato | 358/514 |
| 5,321,529 | 6/1994 | Funada | 358/518 |

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A color image input apparatus or scanner which has three color input devices which input three color images and then convert color image optical signals to analog electric signals. Three analog/digital convertors convert the analog signals to digital signals and three shading correction devices execute shading correction for the signals. Line correction devices execute line delays for the signals and then correct color difference of the three colors in the sub-scanning direction. There are three color dot or pixel correction devices which shift the position of each dot of each color within ±1 dot in the main scanning direction; that is each position of re-sampling or correction in the main scanning direction determines data values or correction information from correction coefficients of each position of the re-sampling. Three color output devices which output three color images. The color image apparatus can correct the color image difference in the main scanning direction.

41 Claims, 3 Drawing Sheets $n1' = k0 \cdot n0 + k1 \cdot n1 + k2 \cdot n2 + k3 \cdot n3$

| CORRECTION COEFFICIENT<br>AMOUNT OF POSITION DIFFERENCE | K0 | k1 | k2 | k3 |
|---|---|---|---|---|
| 0 | 0 | 64/64 | 0 | 0 |
| 1/8 | −6/64 | 62/64 | 9/64 | −1/64 |
| 2/8 | −9/64 | 57/64 | 19/64 | −3/64 |
| 3/8 | −9/64 | 49/64 | 30/64 | −6/64 |
| 4/8 | −8/64 | 40/64 | 40/64 | −8/64 |
| 5/8 | −6/64 | 30/64 | 49/64 | −9/64 |
| 6/8 | −3/64 | 19/64 | 57/64 | −9/64 |
| 7/8 | −1/64 | 9/64 | 62/64 | −6/64 |

5,500,746

COLOR IMAGE INPUT APPARATUS

BACKGROUND OF THE INVENTION

1. Field of the Invention

This invention relates to a color image input apparatus or scanner which is used in a color copying machine and the like. The invention particularly relates to a color image input apparatus which inputs a color image by plural CCDs which are installed in parallel.

2. Discussion of the Background

Conventionally, there is an apparatus which is shown in FIG. 5 as a color image input apparatus. That is, three CCDs 501R, 501G, 501B which corresponded to R, G, B respectively are installed in some interval (8 lines in FIG. 5) in the sub-scanning direction in parallel. The three line CCDs 501 resolve a color image into image pixel data of R, G, B which corresponded to the CCDs, 501R, 501G, 501B. In this apparatus, the three line CCDs 501 move in a sub-scanning direction, relative to a document being scanned, in the order of B, G, R and are installed at 8 line intervals respectively. Therefore, the CCD 501B reads at a given position of a document image, the CCD 501R reads at position which is delayed 8 lines and the CCD 501R reads the position at a delay of 16 lines. B pixel data which is read by the CCD 501B is output at a delay of 16 lines, G pixel data which is read by the CCD 501G is outputted at a delay of 8 lines, and R pixel data which is read by the CCD 501R is output at real time. As a result, the document image in the position can be obtained as R, G, B pixel data.

According to the above technique, the time difference of line unit in the sub-direction is corrected by a delay process and therefore the R, G, B pixel data of the same line of the document image can be obtained. However, it is assumed that the three CCDs read the image of the same position in the main scanning direction, and the different of the reading position in the main direction is not considered. Therefore, a problem of a color difference by the difference of the reading position in the main direction occurs. Specifically, as shown in FIG. 6, the difference of the reading position in the main direction by the twist of the three line CCDs and the distortion when they are installed (Δx in FIG. 6) and the like may occur. As a result, the problem of a color difference occurs and a clear image cannot be obtained.

SUMMARY OF THE INVENTION

Accordingly, one object of this invention is to provide a color image input apparatus which corrects the color difference in the main scanning direction which occurs due to a twist or misalignment of the three line CCDs. The invention also corrects the distortion which occurs when the three line CCDs are installed and the like, and obtains a clear image.

These and other objects and advantages are achieved by the present invention which provides for a digital electronic camera apparatus having three color input devices which input three color images and then convert color image optical signals to analog electric signals. Three analog/digital convertors convert the analog signals to digital signals and three shading correction devices execute shading correction for the signals. Line correction devices execute line delays for the signals and then correct color difference of the three colors in the sub-scanning direction. There are three color dot or pixel correction devices which shift the position of each dot of each color within ±1 dot in the main scanning direction; that is each position of re-sampling or correction in the main scanning direction determines data values or correction information from correction coefficients of each position of the re-sampling. Three color output devices which output three color images. The color image apparatus can correct the color image difference in the main scanning direction.

BRIEF DESCRIPTION OF THE DRAWINGS

In describing preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein.

DESCRIPTION OF THE PREFERRED EMBODIMENT

Figure 1:
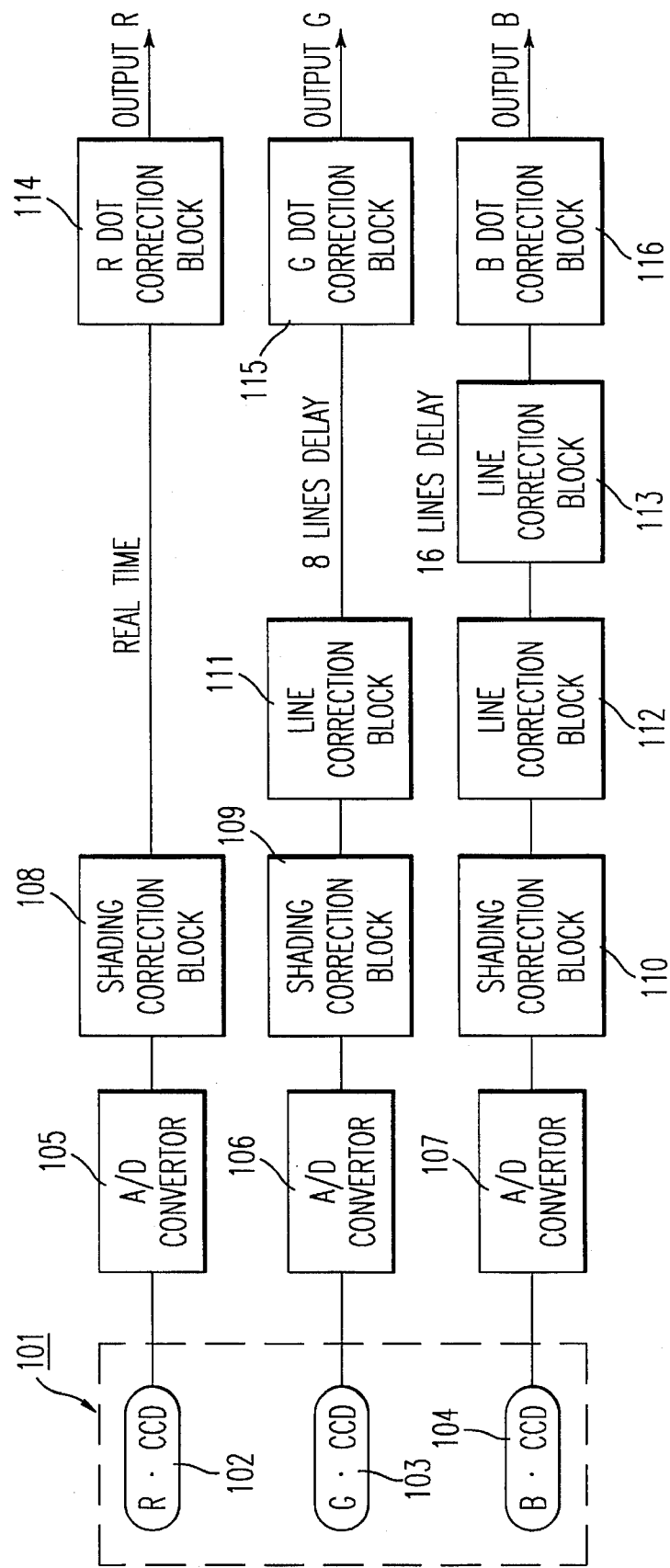
FIG. 1 is a block diagram of an apparatus of the present invention.

Referring now to the drawings, wherein like reference numerals designate identical or corresponding parts throughout the several views, and more particularly to FIG. 1 thereof, there is illustrated a block diagram of an apparatus of the present invention. As shown in FIG. 1, 101 indicates three line CCDs which are installed in parallel at 8 line intervals. The three line CCDs 101 are composed of an R CCD 102 which converts a red light signal from a document to an analog electric signal, a G CCD 103 which converts a green light to an analog electric signal, and a B CCD 104 which converts a blue light signal to an analog electric signal.

Numbers 105–107 indicate A/D converters which convert the analog signals to digital signals, numbers 108–110 indicate shading correction circuits, numbers 111–113 indicate line interval correction circuits in which 8 lines of image data are delayed and a difference of reading position in the sub-scanning direction is corrected.

Number 114 indicates an R dot correction block in which the image data from the CCD 102 is shifted within the range of ±1 dot (pixel) in the main scanning direction that is re-sampling. Number 115 indicates a G dot correction block in which the image data from the CCD 103 is shifted within the range of ±1 dot (pixel) in the main scanning direction that is re-sampling. Number 116 indicates a B dot correction block in which the image data from the CCD 104 is shifted within the range of ±1 dot (pixel) in the main scanning direction that is re-sampling.

The operation of the present invention will now be described. Light from a light source is reflected on a color document and the reflected light is inputted to the three line CCDs 101. The light is converted to image data in the form of R, G and B analog electric signals by the R CCD 102, the G CCD 103 and the B CCD 104, respectively.

The image data is converted to digital signals in the A/D converters 105–107 and then shading correction is executed on the digital signals in the shading correction circuits 108–110. The image data from G CCD 103 is delayed 8 lines in the line interval correction circuit 111 and then is inputted to the G dot correction bock 115. The image data from B CCD 104 is delayed 16 lines in the line interval correction circuits 112 and 13 and then is inputted to the B dot correction block 116. On the other hand, the image data from the R CCD 102 is inputted to the R dot correction block 114 without delay; that is in real time.

The difference of the reading positions among R CCD 102, G CCD 103 and B CCD 104 in the sub-direction, the difference of 8 line intervals, is corrected by the above line interval correction (delay process). Therefore the same line is inputted to the R dot correction block 114, the G dot correction block 115 and the B dot line correction block, respectively.

In the R dot correction block 114, the G dot correction block 115 and the B dot line correction block, each image data is shifted within ±1 dot (pixel) in the main scanning direction. As a result, the difference of the reading positions caused by the twist of the three line CCD, the distortion due to the installation and the like is corrected and the corrected image data is outputted.

The detailed operation of the dot correction in the R dot correction block 114, the G dot correction block 115 and the B dot line correction block will now be described. The dot correction blocks 114–116 correct the difference of the reading position within ±1 dot (pixel) in the main scanning direction by the re-sampling. The method of re-sampling is, for example, the cubical function convolution method or the sinc function method, etc.

Figures 2, 3:
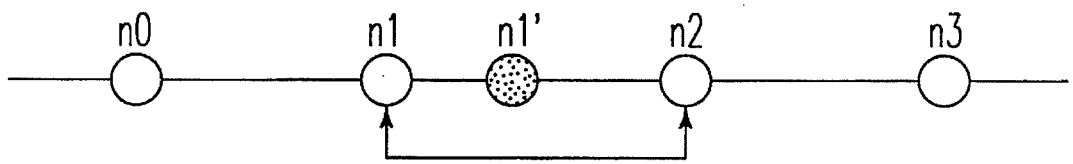
FIG. 2 shows a re-sampling method (cubical function convolution method) of the present invention.
FIG. 3 shows the relation between the amount of the difference and the correction coefficients of the present invention.

The cubical function convolution method is as follows. The point n1 which is to be shifted or corrected, the second or next point n2, the third point n3 and previous point n0 are used and the corrected point n'1 (re-sampling point) between n1 and n2 is calculated using the following equation:

$$n'1 = k0*n0 + k1*n1 + k2*n2 + k3*n3 \quad (1)$$

where k0, k1, k2 and k3 are correction coefficients. When the position precision is ⅛ dot, the relation between the amount of the lag and the correction coefficients is set in the table of FIG. 3. Therefore, if the position of re-sampling, that is the amount of the difference from the point in question such as n1 is found, the correction coefficients are decided according to FIG. 3 and the data n'1 of the re-sampling is obtained by (1).

As described above, the R dot correction block 114, the G dot correction block 115 and the B dot correction block 116 seek the correction coefficients using the correction coefficient which is stored in accordance with the address in the main direction and then determine the data or point n'1 of the sampling point n1 using the cubical function convolution method. As a result, the difference of the reading position in the main scanning direction, which is caused by the twist or the distortion of the installation, etc., is corrected and the corrected image data is outputted as output R, output G and output B. Therefore a clear image without color difference can be obtained.

The amount of the difference from the point which is to be shifted or corrected can be obtained as follows. The amount of the lag caused by the twist of the three line CCD 101, the distortion of their installation and the like in the left and the right parts of the R CCD 102 and the B CCD 104 can be larger than that in the middle part of the R CCD 102 and the B CCD 104, considering the G CCD a reference position. The amount of the lag in the middle part of the R CCD 102 and the B CCD 104 is almost none. Moreover, if the amount of the lag is treated as ⅛ of a pixel, the difference in the main direction can be corrected.

Figure 4:
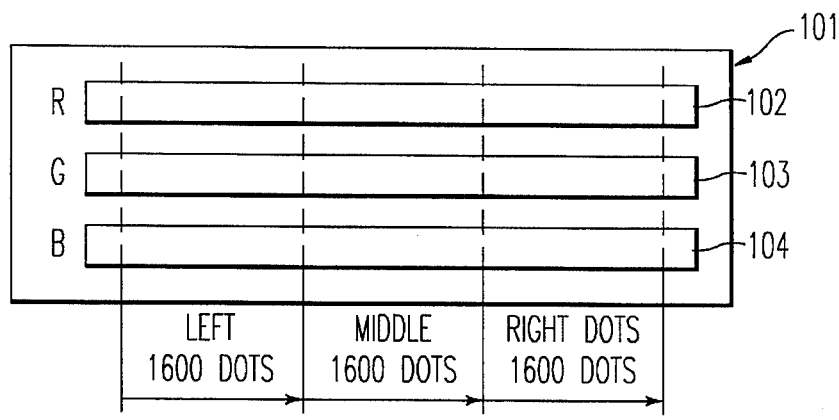
FIG. 4 shows an example of a part where the amount of the difference is corrected of the present invention.
Figure 5:
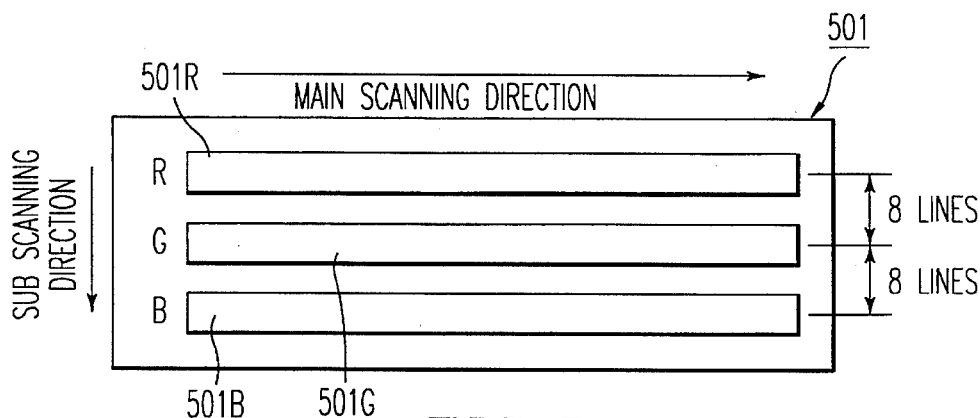
FIG. 5 shows the structure of the three line CCDs.
Figure 6:
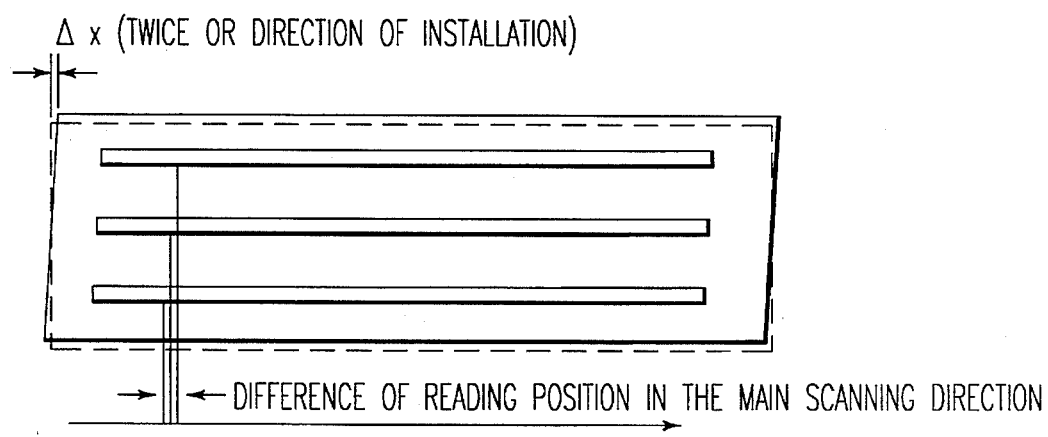
FIG. 6 shows the difference of the reading position in the main scanning direction.

Therefore, as shown in FIG. 4, the R CCD 102 and the B CCD 104 are divided into three parts which are the left part 1600 dots, the middle part 1600 dots and the right part 1600 dots, respectively. The left and the right parts are corrected by ⅛ dot accuracy in the main scanning direction. When the amount of the difference is adjusted on shipping of the apparatus, the amount of the difference of the left and the right parts of the R CCD 102 and the B CCD 14 is measured and the correction coefficients are determined and stored in accordance with an address in the main direction. At this time, as the correction coefficients are determined using the measured amount of the difference, the correction coefficient of the R CCD 102 may be different from that of the B CCD 104. One way in which the invention can be calibrated or set up to determine how much shift is necessary is to scan a predetermined test pattern to determine how much correction is needed.

The described embodiment indicates that when the difference is adjusted on shipping the apparatus, the amount of the difference is measured and the correction coefficient is stored in accordance with the address. However, for example, some types of typical difference patterns can be installed and a serviceman can select a pattern and adjust it.

Moreover, a calculator for calculating the amount of the difference can be installed within the apparatus. At that time, four dots which have the highest difference, which are the lead dot (the left edge dot) and the end dot (the right edge) of R CCD 102, the lead dot (the left edge dot) and the end dot (the right edge) of B CCD 104, are inputted as parameters and then the correction coefficient of each dot are calculated automatically in accordance with the address in the main direction.

Furthermore, in the described embodiment, the amount of the difference is determined to a precision of ⅛ of a pixel. However, for example, when a correction is determined more precisely, for example by 1/16 or 1/30 pixel or less, the amount of the difference can be corrected more accurately and a higher image quality can be obtained.

Moreover, in the described embodiment, the CCDs are arranged in the order of R, G, B in the sub-scanning direction. However, other arrangements are possible, for example, the arrangement of the order of B, G, R in the sub-direction. Further, the invention can be performed using software, hardware, or combination thereof.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A color image input apparatus, comprising:

three color input devices which input three color images and convert the three color images to three analog electric signals;

three analog/digital convertors, respectively connected to the three color input devices, which convert the analog electric signals to digital signals;

three shading correction devices, respectively connected to the three analog/digital converters, which execute shading correction for the signals;

plural line correction devices, connected respectively to at least two of said three shading correction devices, which execute line delays for the signals in a sub-scanning direction;

three color dot correction devices, respectively connected to one of the plural line connection devices and the shading correction devices, which shift a position of each dot of each color within ±1 dot in the main scanning direction, using correction coefficients of each position of re-sampling, and each of the three color dot correction devices uses a cubical function convolution to determine a correction of each dot; and three color output devices, respectively connected to the three-color dot correction devices, which output three color images.

2. A color image input apparatus of claim 1, wherein the three color images are red, green and blue.

3. A color image input apparatus of claim 1, wherein the three color dot correction devices shift the position of each dot in the main scanning direction by a different amount for the three colors.

4. A color image input apparatus of claim 1, wherein the three color dot correction devices have a precision of ⅛ dot or less.

5. A color image input apparatus of claim 1, wherein the three color dot correction devices have a reference of each dot using a G CCD and executes the color dot correction relative to the reference of the G CCD on dots of each left part and each right part of an R CCD and a B CCD which are divided into three parts in the main scanning direction.

6. A color image input apparatus of claim 1, further comprising a measuring device, connected to the three color dot correction devices, which measure an amount of shift required to correct a position of each pixel.

7. A color image input apparatus of claim 1, further comprising:

a storage device, connected to the three dot correction devices, which store a plurality of predetermined position patterns;

wherein in the three color dot correction devices, one of the plurality of predetermined position patterns is selected.

8. A color image input apparatus of claim 1, wherein each of said three color dot correction devices include a device which calculates the shifted position of each dot of each color using a difference from reference positions of left and right edge dots of each color CCD.

9. A color image input apparatus of claim 8, wherein each of the devices which calculate is installed in the apparatus.

10. A color image input apparatus of claim 1, wherein said plural line correction devices cause one color signal to be sent at real time, another color signal is delayed by 8 lines, and another color signal is delayed by 16 lines.

11. A method of inputting and processing an image, comprising the steps of:

determining an amount of misalignment in a first direction of a plurality of light detectors which are spaced apart in a second direction;

scanning a document using said plurality of light detectors by moving an image of the document in the first direction relative to the plurality of light detectors, and generating a plurality of scan signals which include pixels representing an image of the scanned document which respectively corresponds to said plurality of light detectors;

correcting the pixels of at least one of said plurality of scan signals using the determined amount of misalignment of the plurality of light signals and the scan signal of said at least one of said plurality of light detectors, and using a cubical convolution function; and outputting said corrected pixels of said at least one of said plurality of scan signals.

12. The method of claim 11, further comprising the step of:

generating light and irradiating said document with said light during said scanning step.

13. The method of claim 11, wherein:

said step of determining a misalignment determines an amount of misalignment of pixels of the plurality of light detectors; and said step of correcting adjusts an intensity of the pixels of said at least one of said plurality of scan signals using an intensity of said pixel to be corrected, intensities of pixels neighboring said pixel to be corrected, and the determined amount of misalignment of the pixel to be corrected.

14. The method of claim 13, wherein said step of correcting multiplies both the intensity of the pixel to be corrected and the intensities of the pixels neighboring said pixel to be corrected by corresponding correction factors and adds products resulting from said multiplication to obtain a corrected intensity of the pixel to be corrected.

15. The method according to claim 14, wherein said correction factors are chosen using the determined amount of misalignment, of said light detectors.

16. The method according to claim 11, wherein said step of determining an amount of misalignment measures an amount of misalignment of said light detectors.

17. The method according to claim 11, wherein said step of determining an amount of misalignment includes the sub-step of selecting a predetermined pattern which indicates the amount of misalignment of said light detectors.

18. The method according to claim 11, wherein at least one of said plurality of light detectors has two end regions and said step of determining an amount of misalignment determines the amount of misalignment of said at least said end regions.

19. The method according to claim 18, wherein said step of determining an amount of misalignment determines an amount of misalignment of at least one pixel at each of said two end regions and determines the amount of misalignment for each of said pixels using the determined misalignment of said at least one pixel of a corresponding one of said two end regions.

20. The method according to claim 11, further comprising the step of:

delaying at least one of said plurality of scan signals by an amount which corresponds to a separation between said plurality of said can signals in the second direction.

21. An apparatus for inputting and processing an image, comprising:

a plurality of light detectors which are misaligned in a first direction and spaced apart in a second direction;

means for determining an amount of misalignment of said plurality of detectors in the first direction;

means for scanning, connected to said plurality of light detectors, a document using said plurality of light detectors by moving an image of the document in the first direction relative to the plurality of light detectors, and generating a plurality of scan signals which include pixels representing an image of the scanned document which respectively corresponds to said plurality of light detectors;

means, connected to the means for determining an amount of misalignment and the means for scanning, for correcting the pixels of at least one of said plurality of scan signals using the determined amount of misalignment of the plurality of light signals, the scan signal of said at least one of said plurality of light detectors, and using a cubical convolution function; and means, connected to the means for correction, for outputting said corrected pixels of said at least one of said plurality of scan signals.

22. The apparatus of claim 21, further comprising:

a light source which irradiates said document with light during said scanning.

23. The apparatus of claim 21, wherein:

said means for determining a misalignment determines an amount of misalignment of pixels of the plurality of light detectors; and said means for correcting adjusts an intensity of the pixels of said at least one of said plurality of scan signals using an intensity of said pixel to be corrected, intensities of pixels neighboring said pixel to be corrected, and the determined amount of misalignment of the pixel to be corrected.

24. The apparatus of claim 23, wherein said means for correcting multiplies both the intensity of the pixel to be corrected and the intensities of the pixels neighboring said pixel to be corrected by correction factors and adds products resulting from said multiplication to determine a corrected intensity of the pixel to be corrected.

25. The apparatus according to claim 24, wherein said correction factors are chosen using the determined amount of misalignment.

26. The apparatus according to claim 21, wherein said means for determining an amount of misalignment measures an amount of misalignment.

27. The apparatus according to claim 21, wherein said means for determining an amount of misalignment includes means for selecting a predetermined pattern which indicates the amount of misalignment of said light detectors.

28. The apparatus according to claim 21, wherein said at least one of said plurality of light detectors has at least two end regions and said means for determining an amount of misalignment determines an amount of misalignment of said end regions.

29. The apparatus according to claim 28, wherein said means for determining an amount of misalignment determines an amount of misalignment of at least one pixel at each of said two end regions and determines the amount of misalignment for each of said pixels using the determined misalignment of said at least one pixel of a corresponding one of said two end regions.

30. The apparatus according to claim 21, further comprising:

means, connected to at least one of said plurality of light detectors, for delaying the scan signals output therefrom by an amount which corresponds to a separation between said plurality of said can signals in the second direction.

31. A color image input apparatus, comprising:

three color input devices which input three color images and convert the three color images to three analog electric signals;

three analog/digital convertors, respectively connected to the three color input devices, which convert the analog electric signals to digital signals;

three shading correction devices, respectively connected to the three analog/digital converters, which execute shading correction for the signals;

plural line correction devices, connected respectively to at least two of said three shading correction devices, which execute line delays for the signals in a sub-scanning direction;

three color dot correction devices, respectively connected to one of the plural line connection devices and the shading correction devices, which shift a position of each dot of each color within ±1 dot in the main scanning direction, using correction coefficients of each position of re-sampling;

a measuring device, connected to the three color dot correction devices, which measure an amount of shift required to correct a position of each pixel; and three color output devices, respectively connected to the three-color dot correction devices, which output three color images.

32. A method of inputting and processing an image, comprising the steps of:

determining an amount of misalignment in a first direction of a plurality of light detectors which are spaced apart in a second direction;

scanning a document using said plurality of light detectors by moving an image of the document in the first direction relative to the plurality of light detectors, and generating a plurality of scan signals which include pixels representing an image of the scanned document which respectively corresponds to said plurality of light detectors;

correcting the pixels of at least one of said plurality of scan signals using the determined amount of misalignment of the plurality of light signals and the scan signal of said at least one of said plurality of light detectors; and outputting said corrected pixels of said at least one of said plurality of scan signals, wherein:

said step of determining a misalignment determines an amount of misalignment of pixels of the plurality of light detectors; and said step of correcting adjusts an intensity of the pixels of said at least one of said plurality of scan signals using an intensity of said pixel to be corrected, intensities of pixels neighboring said pixel to be corrected, and the determined amount of misalignment of the pixel to be corrected.

33. The method of claim 32, wherein said step of correcting multiplies both the intensity of the pixel to be corrected and the intensities of the pixels neighboring said pixel to be corrected by corresponding correction factors and adds products resulting from said multiplication to obtain a corrected intensity of the pixel to be corrected.

34. The method according to claim 33, wherein said correction factors are chosen using the determined amount of misalignment, of said light detectors.

35. The method according to claim 33, wherein said correction factors are determined using a cubical convolution function.

36. The method according to claim 33, wherein said correction factors are determined using a sinc function.

37. An apparatus for inputting and processing an image, comprising:

a plurality of light detectors which are misaligned in a first direction and spaced apart in a second direction;

means for determining an amount of misalignment of said plurality of detectors in the first direction;

means for scanning, connected to said plurality of light detectors, a document using said plurality of light detectors by moving an image of the document in the first direction relative to the plurality of light detectors, and generating a plurality of scan signals which include pixels representing an image of the scanned document which respectively corresponds to said plurality of light detectors;

means, connected to the means for determining an amount of misalignment and the means for scanning, for correcting the pixels of at least one of said plurality of scan signals using the determined amount of misalignment of the plurality of light signals and the scan signal of said at least one of said plurality of light detectors; and means, connected to the means for correction, for outputting said corrected pixels of said at least one of said plurality of scan signals, wherein:

said means for determining a misalignment determines an amount of misalignment of pixels of the plurality of light detectors; and said means for correcting adjusts an intensity of the pixels of said at least one of said plurality of scan signals using an intensity of said pixel to be corrected, intensities of pixels neighboring said pixel to be corrected, and the determined amount of misalignment of the pixel to be corrected.

38. The apparatus of claim 37, wherein said means for correcting multiplies both the intensity of the pixel to be corrected and the intensities of the pixels neighboring said pixel to be corrected by correction factors and adds products resulting from said multiplication to determine a corrected intensity of the pixel to be corrected.

39. The apparatus according to claim 38, wherein said correction factors are chosen using the determined amount of misalignment.

40. The apparatus according to claim 38, wherein said correction factors are determined using a cubical convolution function.

41. The apparatus according to claim 38, wherein said correction factors are determined using a sinc function.

\* \* \* \* \*